United States Patent [19]

Kaneko et al.

[11] Patent Number: 5,754,526
[45] Date of Patent: May 19, 1998

[54] CHANNEL SWITCHING METHOD AND CHANNEL SWITCHING CONTROLLER

[75] Inventors: Hirokazu Kaneko; Masahiro Ueno; Yasuo Hirota; Wataru Kikuchi; Masafumi Asano; Rikiya Okamoto; Seiji Inaba; Toshiyuki Yamaguchi; Jun Ito; Takashi Imazato, all of Kawasaki, Japan

[73] Assignee: Fujitsu Limited, Kawasaki, Japan

[21] Appl. No.: 587,489

[22] Filed: Jan. 17, 1996

[30] Foreign Application Priority Data

Mar. 16, 1995 [JP] Japan ............... 7-056891

[51] Int. Cl.[6] ............... H04M 3/00; H04Q 11/04
[52] U.S. Cl. ............... 370/217; 370/244; 395/182.08
[58] Field of Search ............... 370/217–220, 370/244, 250, 251; 395/182.08, 182.11

[56] References Cited

U.S. PATENT DOCUMENTS

| 5,283,782 | 2/1994 | Takase et al. | 370/219 |
| 5,410,591 | 4/1995 | Takahashi | 379/201 |
| 5,414,696 | 5/1995 | Tsuzuki et al. | 370/219 |
| 5,488,606 | 1/1996 | Kakuma et al. | 370/219 |

FOREIGN PATENT DOCUMENTS

| 0 488 610 | 6/1992 | European Pat. Off. |
| 0 503 640 | 9/1992 | European Pat. Off. |
| 94/24805 | 10/1994 | WIPO |

*Primary Examiner*—Melvin Marcelo
*Attorney, Agent, or Firm*—Staas & Halsey

[57] ABSTRACT

A channel switching controller is applied to a communication network such as an ISDN. The network has a first information processor, an exchange, and a second information processor. The channel switching controller easily and speedily switches channels from one to another when a communication error occurs in the network. If communication between the first and second information processors fails, the first information processor notifies the exchange that a communication channel, terminal, or line (telephone number) that is presently being used will be switched to another. In response to the notification, the exchange holds the current call. The first information processor resumes communication through the newly selected communication channel, terminal, or line (telephone number), and the exchange releases the call, to continue the communication between the first and second information processors. The first information processor may notify the second information processor of the failure of the communication channel, terminal, or line (telephone number), to let the second information processor make a call accordingly.

18 Claims, 12 Drawing Sheets

C/R: COMMAND/RESPONSE

| U-CMD1 | U-CMD2 | NAME OF FRAME |
|---|---|---|
| 011 | 11 | SABME (SET MULTIFRAME LINK OF EXTENDED MODE) |
| 000 | 11 | DM (NOTIFY OF CUTTING MULTIFRAME LINK) |
| 000 | 00 | UI (TRANSFER INFORMATION UNDER NONCONFIRMATION TRANSFER MODE) |
| 010 | 00 | DISC (INSTRUCT TO CUT MULTIFRAME LINK) |
| 011 | 00 | UA (ACKNOWLEDGE SABME OR DISC) |
| 100 | 01 | FRMR (NOTIFY OF RECEPTION FRAME ERROR) |
| 101 | 11 | XID (PARAMETER NEGOTIATION) |
| 101 | 00 | XLC (CHANNEL & LINE NEGOTIATION) |

Fig. 5A

| SWITCHING COMMAND 1 BYTE | SWITCHING INFORMATION |
|---|---|

Fig. 5B

| SWITCHING COMMAND | DESTINATION | |
|---|---|---|
| 01hex | EXCHANGE | B1 TO B2 IN ISDN BASE-STAGE IF. |
| 02hex | EXCHANGE | B2 TO B1 IN ISDN BASE-STAGE IF. |
| 03hex | EXCHANGE | SWITCHING SUBADDRESSES IN ISDN BASE-STAGE IF. |
| 04hex | EXCHANGE | SWITCHING TELEPHONE NUMBERS |
| 11hex | EXCHANGE | SWITCHING B CHANNELS IN ISDN PRIMARY-STAGE IF. |
| 12hex | EXCHANGE | SWITCHING $H_0$ CHANNELS IN ISDN PRIMARY-STAGE IF. |
| 83hex | OPPOSITE PARTY | SWITCHING SUBADDRESSES IN ISDN BASE-STAGE IF. |
| 84hex | OPPOSITE PARTY | SWITCHING TELEPHONE NUMBERS |

Fig.6A

| SWITCHING CMD 01hex | FCS1 1 BYTE | FCS2 1 BYTE | FLAG 01111110 |
|---|---|---|---|

Fig.6B

| SWITCHING CMD 02hex | FCS1 1 BYTE | FCS2 1 BYTE | FLAG 01111110 |
|---|---|---|---|

Fig.6C

| SWITCHING CMD 03hex | SUBADDRESS SWITCHED TO | FCS1 1 BYTE | FCS2 1 BYTE | FLAG 01111110 |
|---|---|---|---|---|

Fig.6D

| SWITCHING CMD 04hex | PHONE NO. SWITCHED TO | FCS1 1 BYTE | FCS2 1 BYTE | FLAG 01111110 |
|---|---|---|---|---|

Fig. 7A

| SWITCHING CMD 11hex | B-CHANNEL SWITCHED FROM | B-CHANNEL SWITCHED TO | FCS1 1 BYTE | FCS2 1 BYTE | FLAG 01111110 |
|---|---|---|---|---|---|

Fig. 7B

| SWITCHING CMD 12hex | H₀-CHANNEL SWITCHED FROM | H₀-CHANNEL SWITCHED TO | FCS1 1 BYTE | FCS2 1 BYTE | FLAG 01111110 |
|---|---|---|---|---|---|

Fig. 7C

| SWITCHING CMD 83hex | SUB-ADDRESS SWITCHED FROM | SUB-ADDRESS SWITCHED TO | FCS1 1 BYTE | FCS2 1 BYTE | FLAG 01111110 |
|---|---|---|---|---|---|

Fig. 7D

| SWITCHING CMD 84hex | PHONE NO. SWITCHED FROM | PHONE NO. SWITCHED TO | FCS1 1 BYTE | FCS2 1 BYTE | FLAG 01111110 |
|---|---|---|---|---|---|

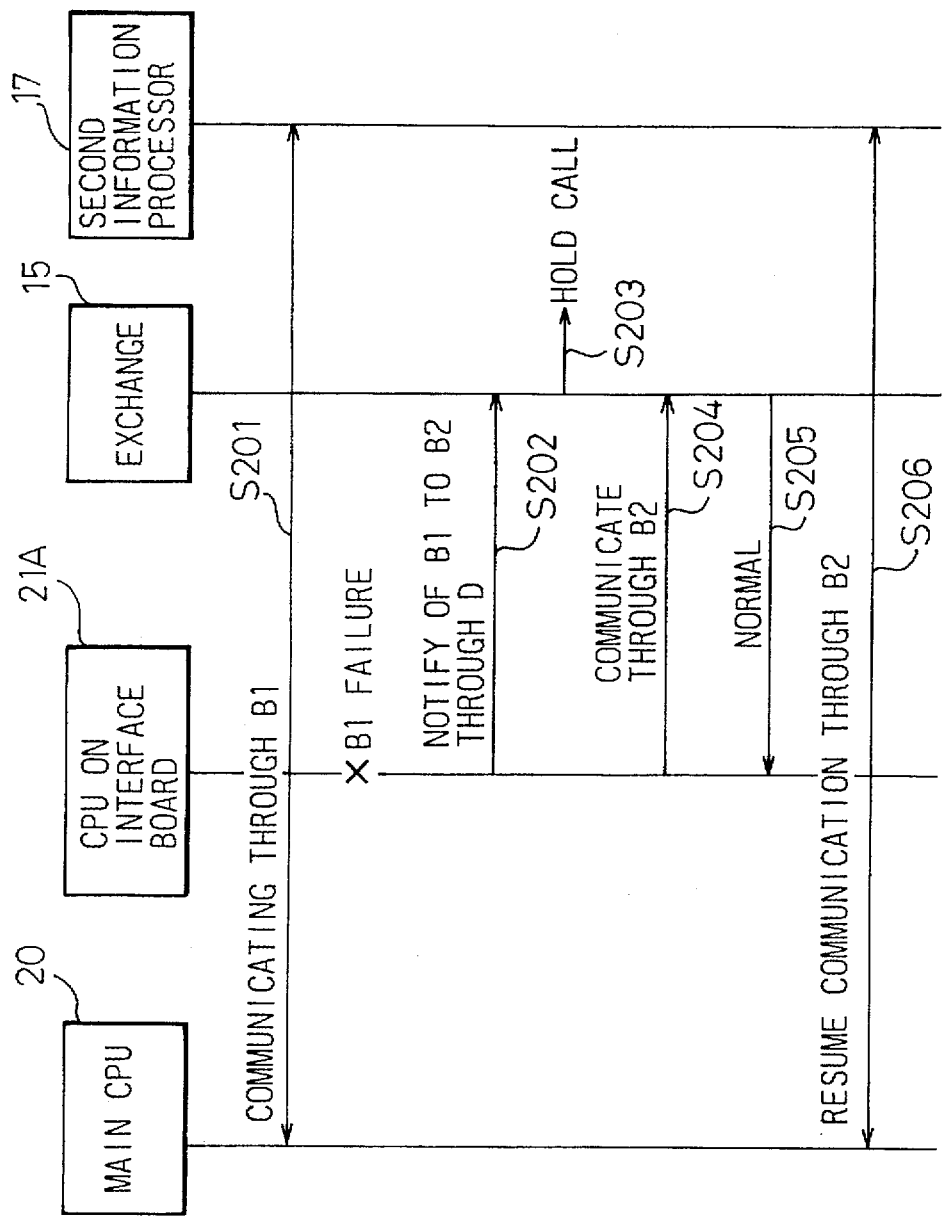

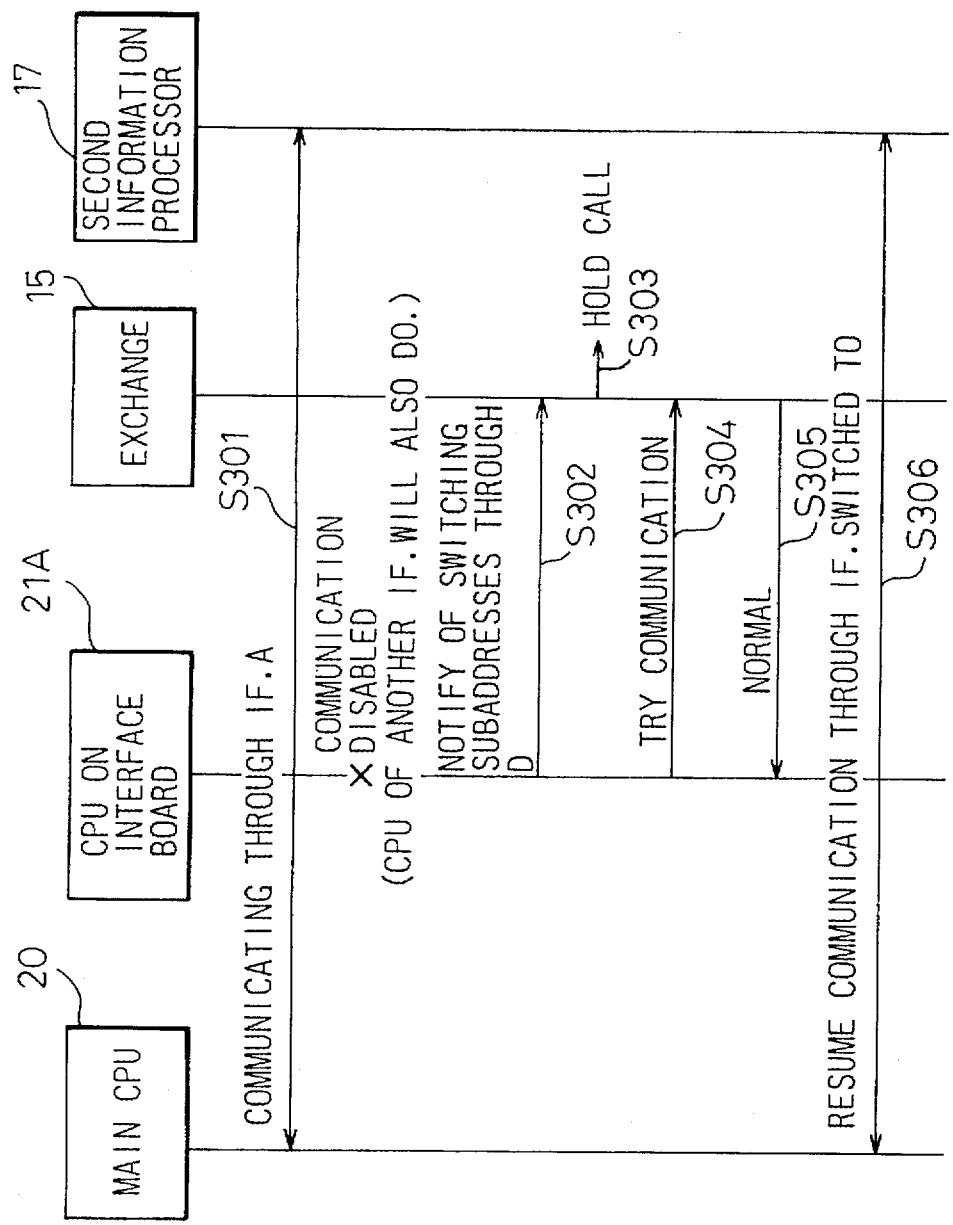

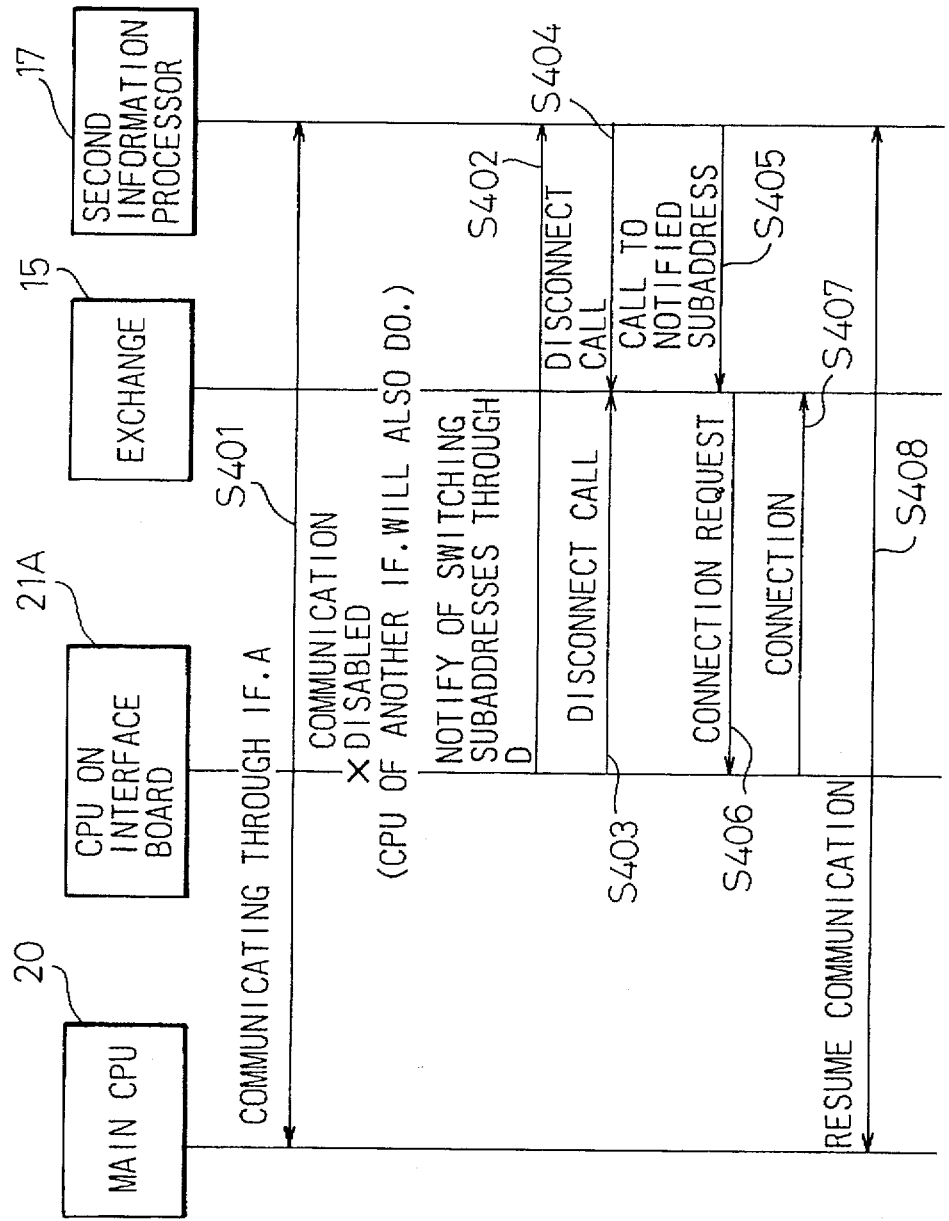

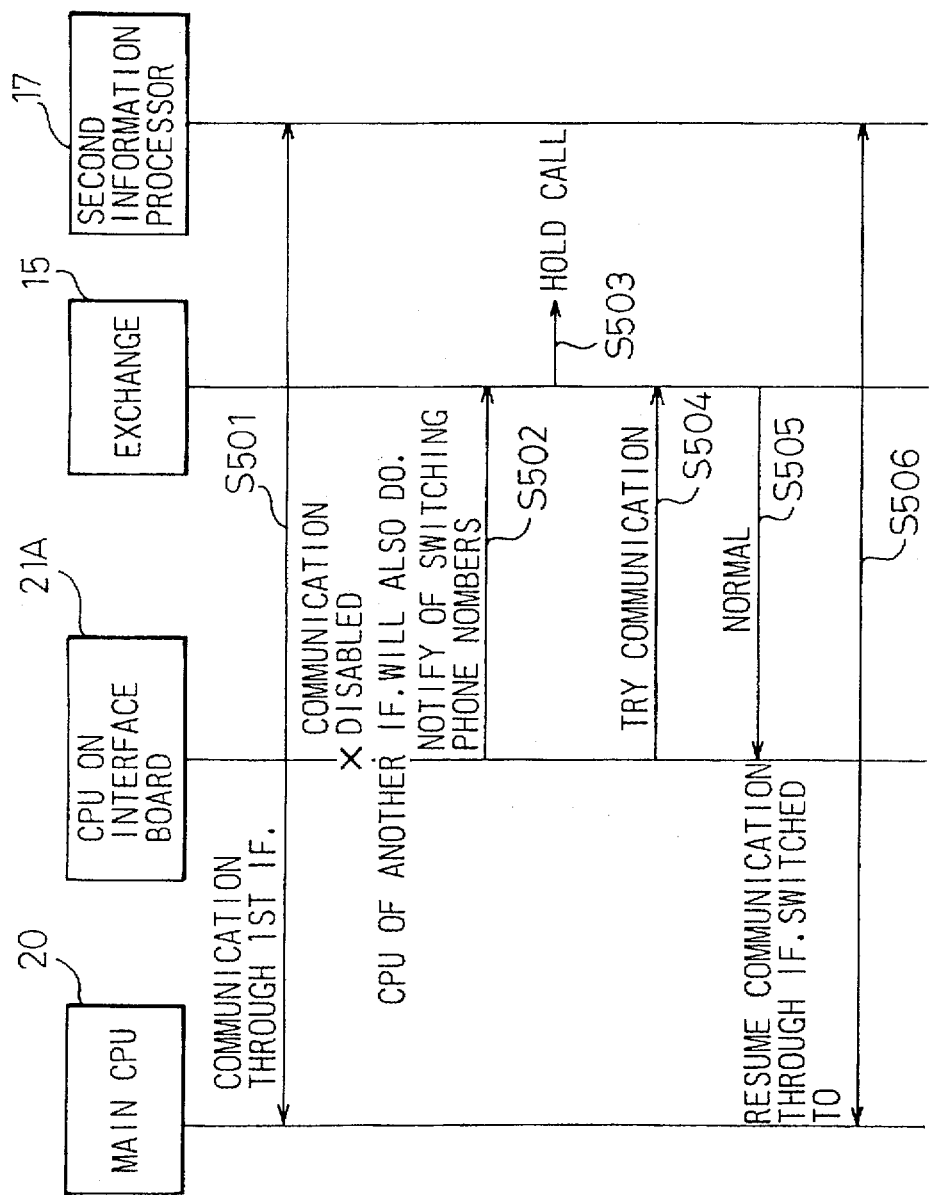

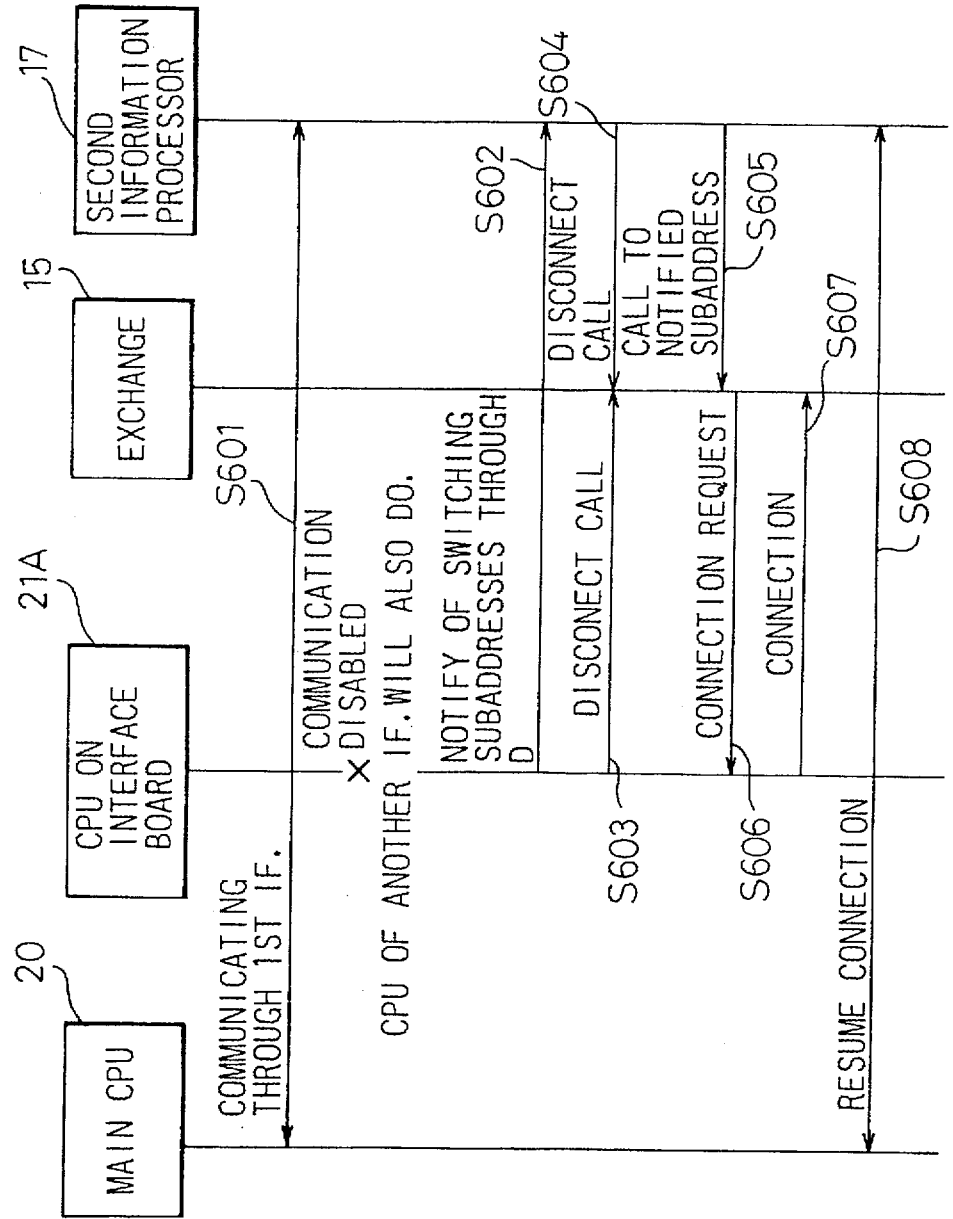

CHANNEL SWITCHING METHOD AND CHANNEL SWITCHING CONTROLLER

BACKGROUND OF THE INVENTION

1. Field of the Invention

The present invention relates to a channel switching method and a channel switching controller for switching channels or lines of an information processor from one to another, to maintain communication established between the information processor and another information processor through one of the channels or lines even if the channel or line used fails.

2. Description of the Related Art

A communication network usually involves a first information processor, an exchange, and a second information processor. The first information processor, which controls a plurality of channels or lines, makes a call through one of the channels or lines to communicate with the second information processor via the exchange. If communication between them fails, a related art once terminates the communication and lets the first information processor make another call through another one of the channels or lines, to restart communication with the second information processor.

According to the related art, the first information processor has a main CPU and channel controllers. Each of the channel controllers has a communication interface board having a communication CPU. The communication CPU of one of the interface boards controls a call to communicate with the second information processor via the exchange. If communication between them fails, a time-out error occurs at the first information processor and is detected thereby. The second information processor also detects a time-out error and determines that a communication abnormality has happened or communication has forcibly been terminated. The second information processor then sends a disconnection request to the exchange, which disconnects the call to the second information processor.

If the first information processor intends to continuously communicate with the second information processor, it must send a new communication request to the exchange through a second of the communication interface boards. Namely, the communication CPU of the second interface board sends a connection request to the exchange, which sends a reception request to the second information processor. The second information processor sends an acceptance notification to the exchange, which sends a connection completion notification to the second interface board of the first information processor. The communication CPU of the second interface board sends a communication enabled notification to the main CPU, which starts to communicate with the second information processor.

In this way, the related art carries out connection procedures to let the first information processor communicate with the second information processor through one of the channels or lines. If the channel or line used fails, the related art switches it to another, and with this new channel or line, repeats the connection procedures to let the first information processor again communicate with the second information processor. On the other hand, the second information processor must disconnect the call thereto whenever a time-out error happens, and thereafter, must wait for a new call from the first information processor. In this way, the related art is incapable of providing a fault tolerant system that switches channels or lines from one to another easily and quickly as soon as a communication failure occurs.

SUMMARY OF THE INVENTION

An object of the present invention is to provide a channel switching method and a channel switching controller for easily and quickly switching channels or lines from one to another whenever detecting a communication abnormality.

In order to accomplish the object, the present invention provides a channel switching method for a communication network involving a first information processor, an exchange, and a second information processor, the first information processor having a terminal provided with a control channel and multiplexed communication channels and making a call to communicate with the second information processor through the exchange with the use of one of the communication channels. The method includes the steps of notifying, if the communication channel used fails, the exchange through the control channel that the communication channel will be switched to another; holding the call in the exchange in response to the notification; resuming communication from the first information processor through a newly selected one of the communication channels; and releasing the call held in the exchange, to continue the communication between the first and second information processors with the use of the newly selected communication channel.

The present invention also provides a channel switching method for a communication network involving a first information processor, an exchange, and a second information processor, the first information processor having terminals connected to one another through a bus, each of the terminals having a subaddress, a control channel, and communication channels, the first information processor making a call to communicate with the second information processor through the exchange with the use of one of the terminals. The method includes the steps of notifying, if the terminal used fails, the exchange through the control channel of the failed terminal that the current subaddress will be switched to another; holding the call in the exchange in response to the notification; resuming communication from the first information processor through another of the terminals having a newly selected subaddress; and releasing the call held in the exchange, to continue the communication between the first and second information processors with the use of the newly selected terminal. The subaddress switching notification may be made through the control channel of the newly selected terminal.

The present invention also provides a channel switching method for a communication network involving a first information processor, an exchange, and a second information processor, the first information processor having terminals each provided with a control channel and communication channels, the first information processor making a call to communicate with the second information processor through the exchange with the use of one of the terminals. The method includes the steps of, if the terminal being used fails, notifying the exchange through the control channel of the failed terminal that the failed terminal will be switched to another; holding the call in the exchange in response to the notification; resuming communication from the first information processor through the newly selected terminal; and releasing the call held in the exchange, to continue the communication between the first and second information processors with the use of the newly selected terminal. The switching notification may be made through the control channel of the newly selected terminal.

According to the present invention, the first information processor may make a call to communicate with the second information processor through the exchange with the use of a first one of the terminals of the first information processor. If the first terminal fails, the first information processor notifies the second information processor through the exchange of the failure of the first terminal as well as the subaddress or telephone number of another one of the terminals to be used from now on. The second information processor makes a call to the notified subaddress or telephone number, to continue the communication between the first and second information processors.

The present invention is applied to an ISDN, the exchange is an ISDN exchange, and the terminals are connected to an ISDN base- or primary-stage interface. The notification is made with U-CMD1 of "101" and U-CMD2 of "00" in a D-channel format of the ISDN base-stage interface.

BRIEF DESCRIPTION OF THE DRAWINGS

The present invention will be more clearly understood from the description as set forth below with reference to the accompanying drawings, wherein:

FIG. 5A shows an information field of the frame of FIG. 4A, according to an embodiment of the present invention;

FIG. 5B shows switch commands used in the information field of FIG. 5A;

FIGS. 6A to 6D show different forms of the information field;

FIGS. 7A to 7D show different forms of the information field;

FIG. 8 shows control sequences for switching B-channels with a call being held in an exchange;

FIG. 9 shows control sequences for switching subaddresses with a call being held in an exchange;

FIG. 10 shows control sequences for switching subaddresses without holding a call in an exchange;

FIG. 11 shows control sequences for switching telephone numbers with a call being held in an exchange; and FIG. 12 shows control sequences for switching telephone numbers without holding a call in an exchange.

DESCRIPTION OF THE PREFERRED EMBODIMENTS

For a better understanding of the preferred embodiments of the present invention, the problem in the related art will be explained.

Figure 1:
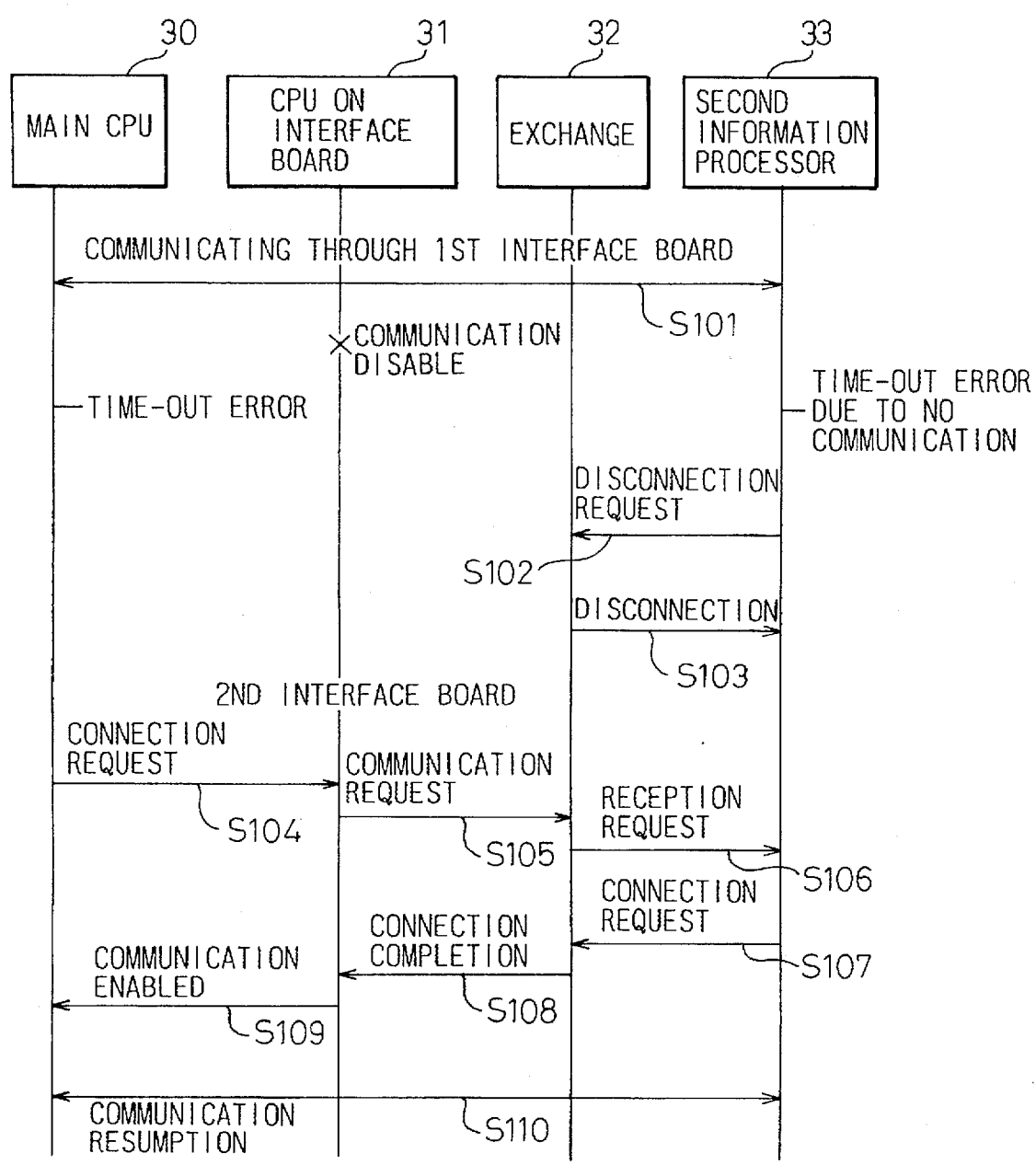
FIG. 1 shows control sequences for switching channels according to a related art.

FIG. 1 shows sequences for switching channels according to the related art.

A first information processor has a main CPU 30 and a communication CPU 31. The CPU 31 is mounted on a communication interface board. The main CPU 30 lets the CPU 31 make a call to communicate with a second information processor 33 through an exchange 32 in step S101. If the communication is disabled, the main CPU 30 detects a time-out error because of no response from the processor 33. At the same time, the processor 33 detects a time-out error due to no communication, determines that a communication abnormality or a forcible termination has occurred, and sends a disconnection request to the exchange 32 in step S102. In response to this request, the exchange 32 disconnects the call to the processor 33 in step S103.

When the main CPU 30 intends to continuously communicate with the processor 33, it must send a communication request through another communication interface board having a communication CPU 31 in step S104. This CPU 31 sends a connection request to the exchange 32 in step S105. In response to the request, the exchange 32 sends a reception request to the processor 33 in step S106. The processor 33 sends an acceptance notification in step S107. In response to this, the exchange 32 sends a connection completion notification to the CPU 31 in step S108. The CPU 31 sends a communication enabled notification to the main CPU 30 in step S109. As a result, the main CPU 30 again communicates with the processor 33 in step S110.

In this way, the first information processor carries out connection procedures through a line. If the line fails, the processor switches it to another and repeats the connection procedures to again communicate with the second information processor 33.

Figure 2:
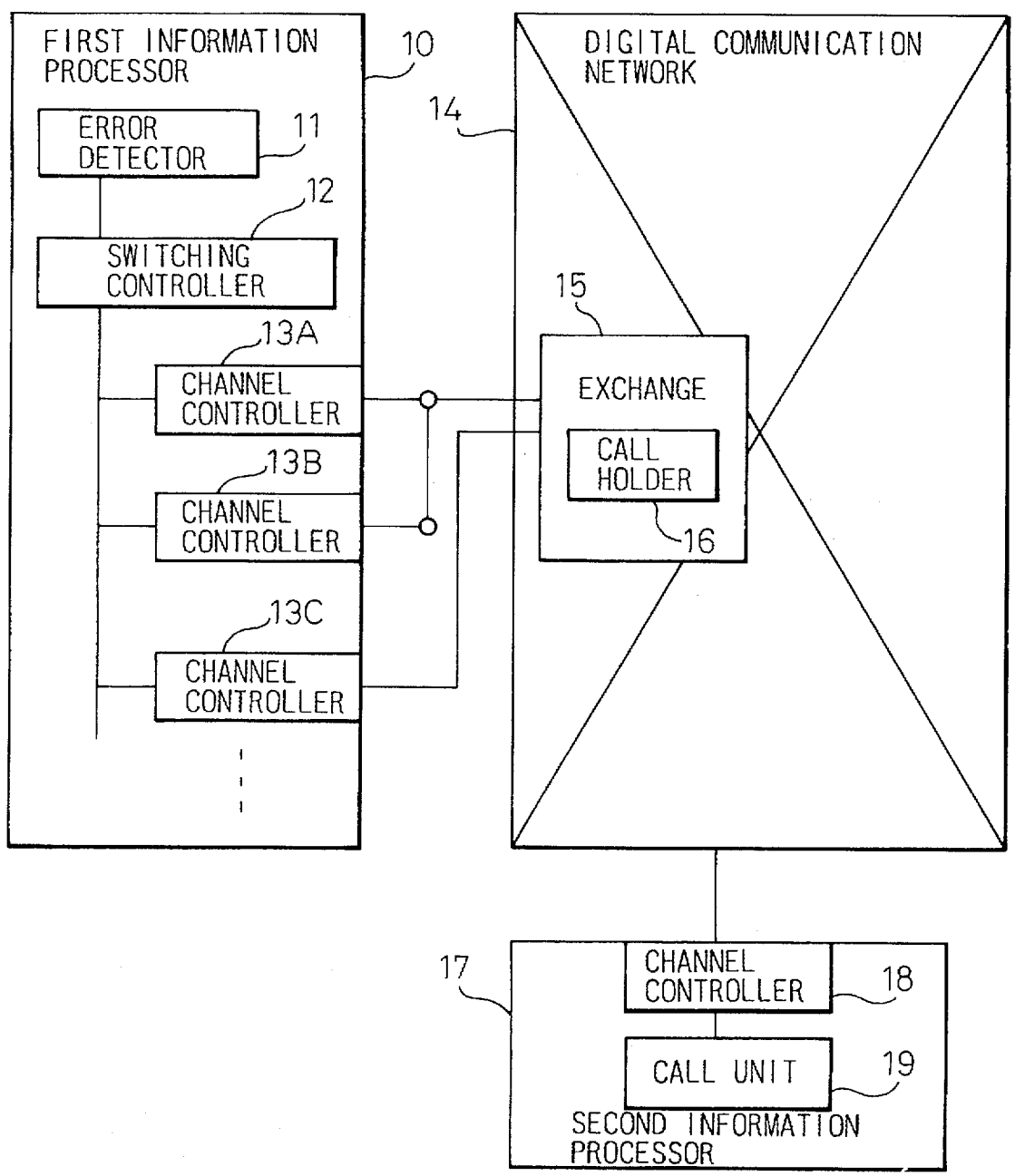
FIG. 2 shows an essential arrangement for switching channels according to the present invention.

FIG. 2 shows an essential arrangement for switching channels according to the present invention.

A first information processor 10 has an error detector 11 for detecting a communication error, a switching controller 12 for switching channels from one to another, and channel controllers 13 (13A, 13B, 13C, and the like). The channel controllers 13 are communication interface boards serving as terminals. A digital communication network 14 such as an ISDN includes an exchange 15. The exchange 15 has a call holder 16. A second information processor 17 has a channel controller 18 and a call unit 19. Although the error detector 11 and switching controller 12 are independent of the channel controllers 13, they may be incorporated in each of the channel controllers 13.

According to a first aspect of the present invention, each of the channel controllers 13 has a plurality of communication channels and a control channel. The processor 10 makes a call to communicate with the processor 17 through the exchange 15 with use of one of the communication channels of one of the channel controllers 13. If the communication channel used fails to disable the communication between the processors 10 and 17, the channel controller 13 used employs the control channel thereof to notify the exchange 15 that the communication channel used will be changed to another. In response to the notification, the exchange 15 holds the call in the call holder 16. The processor 10 switches the communication channel of the channel controller 13 used to another communication channel of the same channel controller 13, to resume communication. Then, the exchange 16 releases the call held in the call holder 16, to continue the communication between the processors 10 and 17 through the newly selected communication channel.

According to a second aspect of the present invention, the channel controllers 13A and 13B, for example, are connected to each other through a bus as shown in FIG. 2 and provided with different subaddresses, respectively. The processor 10 makes a call to communicate with the processor 17 through, for example, the channel controller 13A. If the channel controller 13A fails, the channel controller 13A notifies the exchange 15 through the control channel thereof that the subaddress is going to be changed to another. In response to the notification, the exchange 15 holds the call in the call holder 16. The processor 10 resumes communication through the channel controller 13B having its own subaddress. Then, the exchange 15 releases the call held in the call holder 16, to continue the communication between the processors 10 and 17 through the newly selected channel controller 13B.

Although the second aspect employs the control channel of the channel controller 13A to notify the exchange 15 that the subaddress will be changed, it is possible to employ the control channel of the channel controller 13B or of another channel controller.

According to a third aspect of the present invention, the exchange 15 holds no call after the channel controller 13 notifies the exchange 15 that the subaddress will be changed. Instead, the subaddress switching notification is directly sent to the processor 17. Upon receiving the notification, the processor 17 disconnects the call, and the call unit 19 makes a call through the channel controller 18 to the notified new subaddress, to continue the communication.

In each of the aspects of the present invention, the digital communication network 14 may be an ISDN, and the channel controllers 13 are connected to an ISDN base-stage interface.

According to a fourth aspect of the present invention, the channel controllers 13 are connected to different lines, respectively. The processor 10 makes a call to communicate with the processor 17 through, for example, the channel controller 13A. If the channel controller 13A fails, the channel controller 13A notifies the exchange 15 through the control channel thereof that it will be switched to, for example, the channel controller 13B. In response to the notification, the exchange 15 holds the call in the call holder 16. The processor 10 resumes communication through the channel controller 13B. The exchange 15 releases the call held in the call holder 16, to continue the communication between the processors 10 and 17 through the channel controller 13B.

The channel controller switching notification to the exchange 15 may be made from any one of the other channel controllers instead of the channel controller 13A.

According to a fifth aspect of the present invention, the exchange 15 does not hold a call when the channel controllers 13 are changed from one to another. Namely, the fifth aspect sends a channel controller switching notification directly to the processor 17. Upon receiving the notification, the processor 17 disconnects the call, and the call unit 19 thereof makes a call through the channel controller 18 to the telephone number of the notified channel controller 13, to continue the communication between the processors 10 and 17.

According to the fourth and fifth aspects of the present invention, the digital communication network 14 may be an ISDN and the channel controllers 13 are connected to an ISDN primary-stage interface.

In this way, the first information processor 10 notifies the exchange 15 that a current communication channel, subaddress, or line (telephone number) is going to be changed to another. In response to the notification, the exchange 15 holds a current call. Once a newly selected communication channel, subaddress, or telephone number establishes communication, the exchange 15 releases the call to continue the communication between the processors 10 and 17. Namely, the present invention holds a call to the processor 17 when channels or lines are switched from one to another. To maintain communication, the processor 17 is required only to secure a little longer wait time, and no repetition of connection procedures is required.

If the second information processor 17 receives a line (telephone number) switching notification from the first information processor 10, the processor 17 makes a call to the notified telephone number to resume communication. In this case, connection procedures are simple, and there is no need of detecting a communication abnormality such as a time-out error. This results in minimizing a time necessary for the processor 17 to connect it to the notified line of the processor 10 and quickening the resumption of communication.

Figure 3:
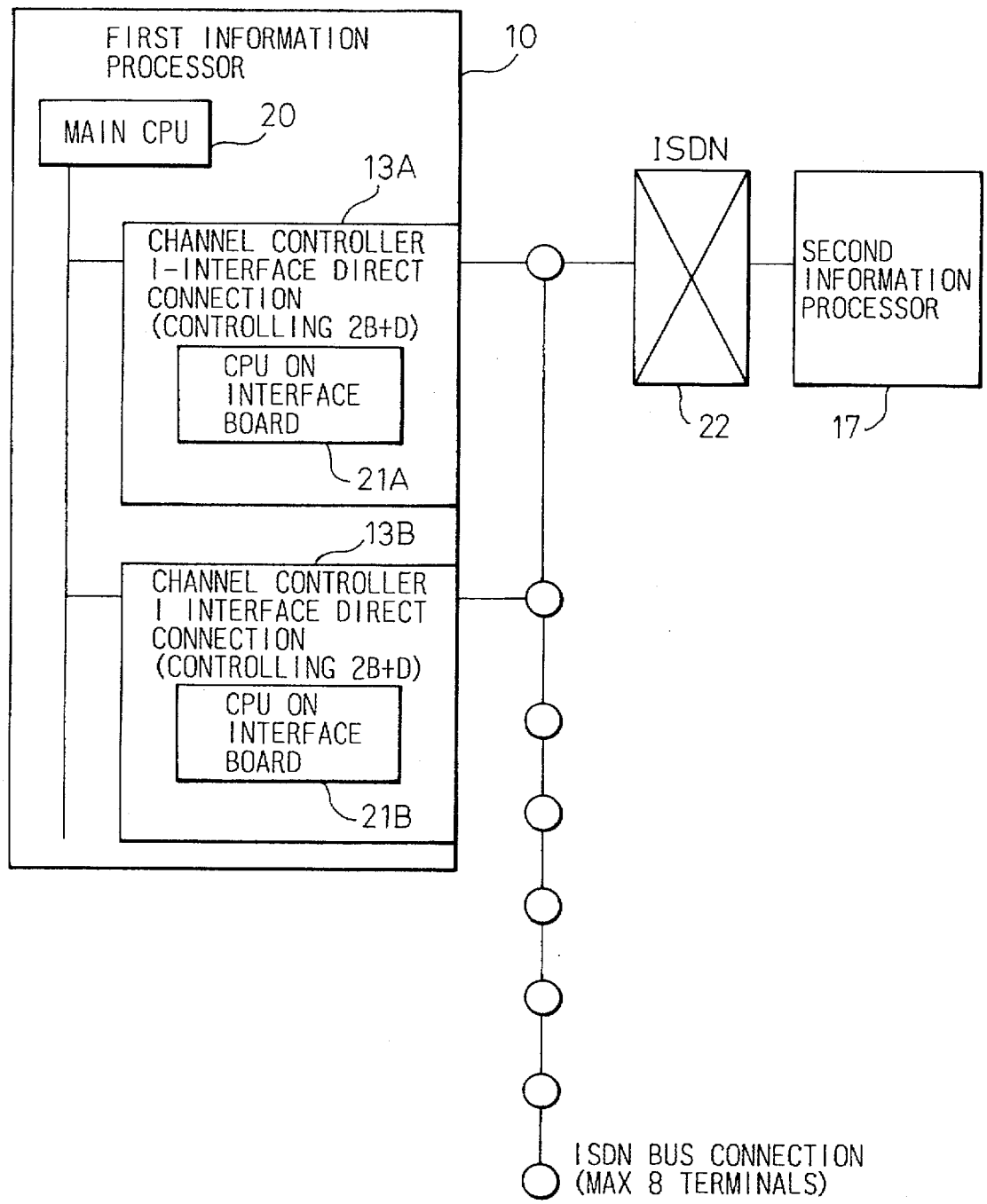
FIG. 3 shows a communication network employing a channel switching controller according to the present invention.

FIG. 3 shows a system employing a channel switching controller according to the present invention.

A first information processor 10 has a main CPU 20 and channel controllers 13A and 13B connected to an ISDN base-stage interface. The channel controllers 13A and 13B serve as terminals and have each an interface board on which a communication CPU 21A (21B) is mounted. There will be eight such interface boards at the maximum. These interface boards are connected to one another through an ISDN bus, which is connected to an ISDN network 22. The CPUs 21A and 21B control channels or lines.

Changing channels from one to another according to the second aspect of the present invention will be explained next in connection with the ISDN base-stage interface.

The ISDN base-stage interface involves two B-channels for transmitting user information such as audio and data signals, and a D-channel for transmitting control signals such as call control signals. The first information processor 10 of FIG. 3 employs one of the B-channels of, for example, the channel controller 13A to make a call to communicate with the second information processor 17. If the channel controller 13A fails, the processor 10 switches the channel controller 13A to the channel controller 13B and resumes communication.

At this time, the processor 10 notifies the network 22 of the switching of channels and a new subaddress. These data are transmitted to the network 22 through the D-channel of the channel controller 13A. If this D-channel is out of order due to the failure of the channel controller 13A, the D-channel of the channel controller 13B is used.

According to the data transmitted from the processor 10, the ISDN network 22 recognizes the new subaddress, communicates with the channel controller 13B having the new subaddress, and determines which of the B1- and B2-channels is used. If the B1-channel has been used before the switching of the channel controllers, and the B2-channel is used thereafter, the network 22 changes data on the B2-channel from the channel controller 13B into data on the B1-channel, which is transmitted to the processor 17.

Channel switching instructions transmitted from the processor 10 to the ISDN network 22 will be explained next with reference to FIGS. 4A to 7D.

Figures 4A, 4B:
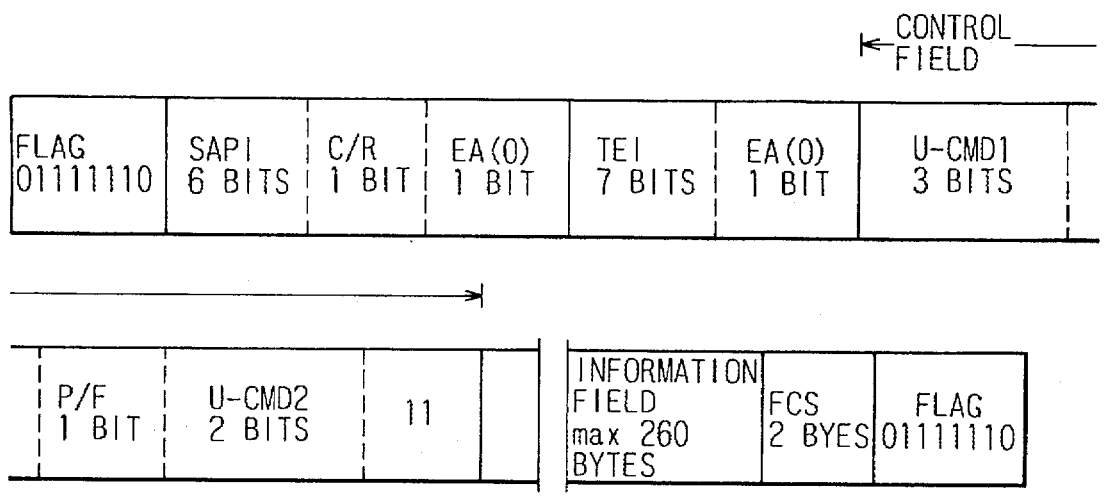
FIG. 4A shows a D-channel frame.
FIG. 4B shows control commands to indicate frame types, used in the frame of FIG. 4A.

FIG. 4A shows a frame transmitted through the D-channel to the ISDN network 22. The frame includes a start flag of "01111110," a 6-bit service access point identifier SAPI, a 1-bit command/response bit C/R, a 1-bit address field expansion bit EA(0), a 7-bit terminal function identifier TEI, a 1-bit address field expansion bit EA(1), an 8-bit control field, an information field of 260 bytes at the maximum, a 2-byte error detecting flag check sequence FCS, and an end flag of "01111110." The control field consists of a 3-bit control command U-CMD1 indicating the type of the frame, a poll/final bit P/F, a 2-bit control command U-CMD2, and two bits of "11."

FIG. 4B shows frame types indicated by the control commands contained in the control field. Frame names SABME, DM, UI, DISC, UA, FRMR, and XID are well known and not directly related to the present invention, and therefore, will not be explained. A frame name XLC (channel and line negotiation) with U-CMD2 of "00" and U-CMD1 of "101" is usually reserved. The present invention uses this XLC as a control command to provide new instructions. Namely, the present invention specifies the control command XLC, to notify the exchange of the switching of channels or lines.

FIGS. 5A to 7D show the details of the control command XLC.

When the XLC is specified in the control field of the frame, the information field includes a 1-byte switching command and switching information as shown in FIG. 5A.

FIG. 5B shows a list of destinations specified by the switching command and the meanings of the command. FIGS. 6A to 7D show different formats following the information field of the frame. These formats correspond to the switching commands of FIG. 5B, respectively.

If the switching command is 01(hex), the destination is the exchange in the network 22, and the B1-channel of the ISDN base-stage interface is switched to the B2-channel thereof. In this case, the information field of the frame is as shown in FIG. 6A having no switching information of FIG. 5A.

If the switching command is 02(hex), the destination is the exchange in the network 22, and the B2-channel of the ISDN base-stage interface is switched to the B1-channel thereof. In this case, the information field of the frame is as shown in FIG. 6B having no switching information of FIG. 5A.

If the switching command is 03(hex), the destination is the exchange in the network 22, and subaddresses (the addresses of mutiplexed channels) are switched from one to another on the ISDN base-stage interface. In this case, the information field of the frame is as shown in FIG. 6C with the switching information indicating a new subaddress.

If the switching command is 04(hex), the destination is the exchange in the network 22, and telephone numbers are switched from one to another. In this case, the information field of the frame is as shown in FIG. 6D with the switching information indicating a new telephone number.

If the switching command is 11(hex), the destination is the exchange in the network 22, and the B-channels of the ISDN primary-stage interface are switched from one to another. In this case, the information field of the frame is as shown in FIG. 7A with the switching information indicating B-channel numbers before and after the switching.

If the switching command is 12(hex), the destination is the exchange in the network 22, and the H0-channels of the ISDN primary-stage interface are switched from one to another. In this case, the information field of the frame is as shown in FIG. 7B with the switching information indicating H0-channel numbers before and after the switching.

If the switching command is 83(hex), the destination is the second information processor 17, and subaddresses based on the ISDN base-stage interface are switched from one to another. In this case, the information field of the frame is as shown in FIG. 7C with the switching information indicating subaddresses before and after the switching.

If the switching command is 84(hex), the destination is the processor 17, and telephone numbers are switched from one to another. In this case, the information field of the frame is as shown in FIG. 7D with the switching information indicating telephone numbers before and after the switching.

The switching commands and switching information mentioned above are only examples. Any other commands and switching information may be used.

The processor 10 of FIG. 3 communicates with the processor 17 through, for example, the channel controller 13A. If the channel controller 13A fails, it will be switched to, for example, the channel controller 13B having a different subaddress. To achieve this, the U-CMD1 is set to "101" and the U-CMD2 to "00." At the same time, the switching command in the information field of the frame is set to (03)hex, and the subaddress of the channel controller 13B is set as the switching information. The frame is then transmitted to the network 22.

Upon receiving the frame, the network 22 recognizes the switching instruction according to the U-CMD1 and U-CMD2. Thereafter, it recognizes the switching command in the information field of the frame. Since the instruction is to switch the current subaddress to another, the network 22 waits for data to be transmitted from the channel controller having the new subaddress. If necessary, the network 22 transfers data from the B1-channel to the B2-channel, or from the B2-channel to the B1-channel and sends the data to the processor 17. In this way, subaddresses are switched from one to another without regard to the processor 17, to resume communication without disconnecting a line to the processor 17.

The ISDN base-stage interface involves two B-channels, which may be switched from one to another. In this case, the switching command of 01(hex) or 02(hex) is used.

The ISDN primary-stage interface involves 24 B-channels. Accordingly, a B-channel "n" may be switched to a B-channel "m." In this case, the switching command of 11(hex) is used. The switching of H0-channels of the ISDN primary-stage interface will be made in a similar manner.

The processor 17 may recognize a switching command and makes a call to a new subaddress or a new telephone number of the processor 10 according to the switching command, to resume communication. In this case, the switching command contained in the frame sent from the processor 10 to the processor 17 is 83(hex) for switching subaddresses, or 84(hex) for switching telephone numbers.

FIG. 8 explains the procedures of switching the B1-channel of the ISDN base-stage interface to the B2-channel thereof.

The main CPU 20 of the processor 10 of FIG. 3 makes a call to communicate with the processor 17 through the B1-channel of the channel controller 13A in step S201. If the B1-channel fails, the communication CPU 21A of the channel controller 13A notifies the exchange of the network 22 through the D-channel thereof that the B1-channel will be switched to the B2-channel with the use of the switching command of 01(hex) in step S202. The exchange holds the call in step S203. The CPU 21A tries to establish communication through the B2-channel in step S204. If the exchange provides a normal response in step S205, the communication between the processors 10 and 17 is resumed through the B2-channel in step S206.

FIG. 9 explains the procedures of switching subaddresses from one to another according to the ISDN base-stage interface.

The main CPU 20 of the processor 10 of FIG. 3 makes a call to communicate with the processor 17 through the channel controller 13A in step S301. If a communication failure occurs, the CPU 21A of the channel controller 13A or the CPU 21B of the channel controller 13B notifies the exchange of the network 22 through the D-channel thereof that the subaddress of the channel controller 13A is switched to that of the channel controller 13B with the use of the switching command of 03(hex) in step S302. The exchange holds the call in step S303. Thereafter, the CPU 21B of the channel controller 13B tries to establish communication in step S304. If the exchange provides a normal response in step S305, the communication between the processors 10 and 17 is resumed through the channel controller 13B in step S306.

FIG. 10 explains the procedures of switching subaddresses from one to another according to the ISDN basestage interface without holding a call in the exchange.

The main CPU 20 of the processor 10 of FIG. 3 makes a call to communicate with the processor 17 through the channel controller 13A in step S401. If a communication failure occurs, the CPU 21A of the channel controller 13A or the CPU 21B of the channel controller 13B sends the switching command 83(hex) indicating that the subaddress of the channel controller 13A is going to be switched to that of the channel controller 13B, to the processor 17 through the D-channel via the exchange of the network 22 in step S402. The call from the channel controller 13A is disconnected in step S403.

Upon receiving the notification of the switching of subaddresses, the processor 17 disconnects the call in step S404 and makes a call to the notified subaddress of the channel controller 13B in step S405. The exchange of the network 22 sends a connection request to the channel controller 13B in step S406. A connection is made in step S407. The communication between the processors 10 and 17 is resumed through the channel controller 13B in step S408.

In FIG. 10, the disconnection of the call in the steps S403 and 404 may not be carried out. In this case, the steps S403 to S407 are replaced with a communication normality test (the steps S304 and S305 of FIG. 9) to be carried out between the CPU 21A and the processor 17.

FIGS. 11 and 12 explain the switching of telephone numbers from one to another with the switching commands of 04(hex) and 84(hex). The operation with the switching command of 04(hex) corresponds to the example of FIG. 9. Namely, the notification of the switching of subaddresses in the step S302 corresponds to step S502 of notifying the switching of telephone numbers. The operation with the switching command of 84(hex) corresponds to the example of FIG. 10. Namely, the step S402 of notifying the switching of subaddresses corresponds to step S602 of notifying the switching of telephone numbers. Accordingly, the details of the procedures of FIGS. 11 and 12 are not explained. The switching of communication channels according to the ISDN primary-stage interface are achieved in the same manner.

As explained above, the present invention resumes a failed communication only after a temporary suspension by switching communication channels, subaddresses, or telephone numbers from one to another without disconnecting a line in a fault tolerant system. The present invention temporarily holds a communication line, to provide an effect as if a plurality of lines are used, to thereby improve the reliability of communication.

The present invention may let an opposite party call an originating party, to resume communication between them. In this case, there is no need for the opposite party to detect a time-out error or wait for the switching of channels. As a result, communication is resumed easily and quickly.

We claim:

1. A method for switching communication channels between a first information processor, an exchange, and a second information processor, the first information processor comprising a terminal provided with a control channel and multiplexed communication channels and making a call to communicate with the second information processor through the exchange with the use of one of the communication channels, said method comprising the steps of:

notifying, if the communication channel used fails, the exchange through the control channel that the communication channel will be switched to another;

holding the call in the exchange in response to the notification;

resuming communication from the first information processor through a newly selected one of the communication channels; and releasing the call held in the exchange, to continue the communication between the first and second information processors with the use of the newly selected communication channel.

2. A method for switching communication channels between a first information processor, an exchange, and a second information processor, the first information processor comprising terminals connected to one another through a bus, each of the terminals comprising a subaddress, a control channel, and communication channels, the first information processor making a call to communicate with the second information processor through the exchange with the use of one of the terminals, said method comprising the steps of:

notifying, if the terminal used fails, the exchange through the control channel of the failed terminal that the current subaddress will be switched to another;

holding the call in the exchange in response to the notification;

resuming communication from the first information processor through another of the terminals having a newly selected subaddress; and releasing the call held in the exchange, to continue the communication between the first and second information processors with the use of the newly selected terminal.

3. A method for switching communication channels between a first information processor, an exchange, and a second information processor, the first information processor comprising terminals connected to one another through a bus, each of the terminals comprising a subaddress, a control channel, and communication channels, the first information processor making a call to communicate with the second information processor through the exchange with the use of a first one of the terminals, said method comprising the steps of:

notifying, if the first terminal fails, the exchange through the control channel of a second one of the terminals that the current subaddress will be switched to that of the second terminal;

holding the call in the exchange in response to the notification;

resuming communication from the first information processor through the second terminal; and releasing the call held in the exchange, to continue the communication between the first and second information processors with the use of the second terminal.

4. A method for switching communication channels between a first information processor, an exchange, and a second information processor, the first information processor comprising terminals connected to one another through a bus, each of the terminals comprising a subaddress, a control channel, and communication channels, the first information processor making a call to communicate with the second information processor through the exchange with the use of one of the terminals, said method comprising the steps of:

notifying, if the terminal used fails, the second information processor through the control channel of a failed terminal of the failure of the terminal as well as the subaddress of another one of the terminals to be used; and making a call from the second information processor to the notified subaddress, to continue the communication between the first and second information processors.

5. The method according to claim 1, wherein the exchange is an ISDN exchange, and the terminals are connected to an ISDN base-stage interface.

6. The method of according to claim 5, wherein the notification is made with U-CMD1 of 101 and U-CMD2 of 00 of a D-channel format of the ISDN base-stage interface.

7. A method for switching communication channels between a first information processor, an exchange, and a second information processor, the first information processor comprising terminals each provided with a control channel and communication channels, the first information processor making a call to communicate with the second information processor through the exchange with the use of one of the terminals, said method comprising the steps of:

notifying, if the terminal used fails, the exchange through the control channel of the failed terminal that the failed terminal will be switched to another;

holding the call in the exchange in response to the notification;

resuming communication from the first information processor through a newly selected one of the terminals; and releasing the call held in the exchange, to continue the communication between the first and second information processors with the use of the newly selected terminal.

8. A method for switching communication channels between a first information processor, an exchange, and a second information processor, the first information processor comprising terminals each provided with a control channel and communication channels, the first information processor making a call to communicate with the second information processor through the exchange with the use of a first one of the terminals that is connected to a first line, said method comprising the steps of:

notifying, if the first terminal fails, the exchange through the control channel of a second one of the terminals that is connected to a second line that the first terminal will be switched to the second terminal;

holding the call in the exchange in response to the notification;

resuming communication from the first information processor through the second terminal; and releasing the call held in the exchange, to continue the communication between the first and second information processors with the use of the second terminal.

9. A method for switching communication channels between a first information processor, an exchange, and a second information processor, the first information processor comprising terminals each provided with a control channel and communication channels, the first information processor making a call to communicate with the second information processor through the exchange with the use of a first one of the terminals, said method comprising the steps of:

notifying, if the first terminal fails, the second information processor through the control channel of the first terminal of the failure of the first terminal as well as the telephone number of another one of the terminals to be used; and making a call from the second information processor to the notified telephone number, to continue the communication between the first and second information processor.

10. The method according to claim 7, wherein the exchange is an ISDN exchange, and the terminals are connected to an ISDN primary-stage interface.

11. The method of according to claim 10, wherein the notification is made with U-CMD1 of 101 and U-CMD2 of 00 of a D-channel format of the ISDN base-stage interface.

12. A controller switching communication channels between a first information processor, an exchange, and a second information processor, the first information processor comprising a terminal provided with a control channel and multiplexed communication channels and making a call to communicate with the second information processor through the exchange with the use of one of the communication channels, comprising:

means for notifying, if the communication channel used fails, the exchange through the control channel that the communication channel will be switched to another and holding the call; and means for resuming communication from the first information processor through a newly selected one of the communication channels and releasing the call held in the exchange, to continue the communication between the first and second information processors with the use of the newly selected communication channel.

13. A controller switching communication channels between a first information processor, an exchange, and a second information processor, the first information processor comprising terminals connected to one another through a bus, each of the terminals comprising a subaddress, a control channel, and communication channels, the first information processor making a call to communicate with the second information processor through the exchange with the use of one of the terminals, comprising:

means for notifying, if the terminal used fails, the exchange through the control channel of the failed terminal that the current subaddress will be switched to another and holding the call in the exchange; and means for resuming communication from the first information processor through another of the terminals comprising selected subaddress and releasing the call held in the exchange, to continue the communication between the first and second information processors with the use of the newly selected terminals.

14. A controller switching communication channels between a first information processor, an exchange, and a second information processor, the first information processor comprising terminals connected to one another through a bus, each of the terminals comprising a subaddress, a control channel, and communication channels, the first information processor making a call to communicate with the second information processor through the exchange with the use of a first one of the terminals, comprising:

means for notifying, if the first terminal fails, the exchange through the control channel of a second one of the terminal that the current subaddress will be switched to that of the second terminal and holding the call in the exchange; and means for resuming communication from the first information processor through the second terminal and releasing the call held in the exchange, to continue the communication between the first and second information processors with the use of the second terminal.

15. A controller switching communication channels between a first information processor, an exchange, and a second information processor, the first information processor comprising terminals connected to one another through a bus, each of the terminals comprising a subaddress, a control channel, and communication channels, the first information processor making a call to communicate with the second information processor through the exchange with the use of one of the terminals, comprising:

means for notifying, if the terminal used fails, the second information processor through the control channel of the failed terminal of the failure of the terminal as well as the subaddress of another one of the terminals to be used; and means for making a call from the second information processor to the notified subaddress, to continue the communication between the first and second information processors.

16. A controller switching communication channels between a first information processor, an exchange, and a second information processor, the first information processor comprising terminals each provided with a control channel and communication channels, the first information processor making a call to communicate with the second information processor through the exchange with the use of one of the terminals, comprising:

means for notifying, if the terminal used fails, the exchange through the control channel of the failed terminal that the failed terminal will be switched to another that is connected to a separate line, and holding the call in exchange; and means for resuming communication from the first information processor through the newly selected terminal and releasing the call held in the exchange, to continue the communication between the first and second information processors with the use of the newly selected terminal.

17. A controller switching communication channels between a first information processor, an exchange, and a second information processor, the first information processor comprising terminals each provided with a control channel and communication channels, the first information processor making a call to communicate with the second information processor through the exchange with the use of a first one of the terminals that is connected to a first line, comprising:

means for notifying, if the first terminal fails, the exchange through the control channel of a second one of the terminals that is connected to a second line that the first terminal will be switched to the second terminal and holding the call in the exchange; and means for resuming communication from the first information processor through the second terminal and releasing the call held in the exchange, to continue the communication between the first and second information processors with the use of the second terminal.

18. A controller switching communication channels between a first information processor, an exchange, and a second information processor, the first information processor comprising terminals each provided with a control channel and communication channels, the first information processor making a call to communicate with the second information processor through the exchange with the use of a first one of the terminals, comprising:

means for notifying, if the first terminal fails, the second information processor through the control channel of the first terminal of the failure of the first terminal as well as the telephone number of another one of the terminals to be used; and means for making a call from the second information processor to the notified telephone number, to continue the communication between the first and second information processors.

* * * * *